United States Patent [19]
Choi

[11] Patent Number: 5,984,108
[45] Date of Patent: Nov. 16, 1999

[54] FLUID FILTERING SYSTEM WITH VARIABLE FILTER LAYER

[76] Inventor: Choong-hyun Choi, Haengoon Villa 101, 119-30 Bangee 2-dong, Seoul, Rep. of Korea

[21] Appl. No.: 09/163,602

[22] Filed: Sep. 30, 1998

[30]    Foreign Application Priority Data

Sep. 30, 1997 [KR]    Rep. of Korea ........................ 97-50047

[51] Int. Cl.⁶ ........................... B01D 39/02; B01D 24/12; B01D 35/28
[52] U.S. Cl. .......................... 210/350; 210/351; 210/354; 210/356; 210/411; 210/791; 210/797
[58] Field of Search ..................................... 210/350, 351, 210/354, 356, 411, 507, 791, 797

[56]    References Cited

U.S. PATENT DOCUMENTS 1,991,847   2/1935   Durgen .
4,167,482   9/1979   Muller .
5,174,907   12/1992  Chown .

FOREIGN PATENT DOCUMENTS 004724   10/1979   European Pat. Off. .

Primary Examiner—Thomas M. Lithgow
Attorney, Agent, or Firm—McDermott, Will & Emery

[57]    ABSTRACT

A permanent fluid filtering system includes a cylindrical body having an upper end, to which an inlet tube is connected, and a lower end, to which an outlet tube is connected, and a latitude thread filter assembly disposed within the cylindrical body. The latitude thread assembly is compressible and expandable in accordance with a fluid flowing direction, thereby varying a porous structure of the filter assembly. The permanent fluid filtering system further includes a fluid flow stabilizing plate for stabilizing the flow of dirty fluid fed inside the body through the inlet tube.

6 Claims, 3 Drawing Sheets

FLUID FILTERING SYSTEM WITH VARIABLE FILTER LAYER

BACKGROUND OF THE INVENTION

1) Field of the Invention

The present invention relates to a fluid filtering system, and more particularly, to a permanent fluid filtering system in which a filter layer can be effectively refined by pressurized air and clean fluid that are reversely fed into the system in a state where a filter layer is varied.

2) Description of Related Arts

Generally, a micro fluid filtering system is used, in a filtration plant, for pre-treating dirty and polluted fluid by filtering suspended solids contained in the fluid before the fluid goes to next highly processing steps (active carbonate, ozone, photocatalyst, and/or membrane separation processes).

The micro fluid filtering system has a filter provided with a fixed porous structure. This fixed porous structure makes it difficult or impossible to reversely refine the filter when the fixed porous structure is obstructed by dirty residue after being used for predetermined hours. Therefore, the filter must be replaced.

That is, since the porous structure is not changed during the reverse refining process of the system using pressurized air and clean fluid, the dirty residue obstructed in the porous structure is not easily removed, thereby reducing the reverse washing rate.

SUMMARY OF THE INVENTION

Therefore, the present invention has been made in an effort to solve the above described problems.

It is an object of the present invention to provide a permanent fluid filtering system which can be effectively refined by varying a porous structure of a filter layer during a refining process using pressurized air or clean fluid.

It is another object of the present invention to provide a permanent fluid filtering system which can precisely adjust a porous structure of a filter layer by forcedly compressing and expanding the filter layer, thereby improving filtering effect.

To achieve the above objects, the present invention provides a permanent fluid filtering system comprising a cylindrical body having an upper end, to which an inlet tube is connected, and a lower end, to which an outlet tube is connected; and a latitude thread filter assembly disposed within the cylindrical body, the latitude thread assembly being compressible and expandable in accordance with a fluid flowing direction, thereby varying a porous structure of the filter assembly.

The permanent fluid filtering system may further comprises a fluid flow stabilizing plate for stabilizing the flow of dirty fluid fed inside the body through the inlet tube. The filter assembly is reversely refined by feeding pressurized air and clean fluid reversely fed into the body through the outlet tube in a state where the assembly is expanded.

The filter assembly comprises a plurality of latitude threads and upper and lower holders for supporting the latitude threads.

The permanent fluid filtering system may further comprises a fluid collecting plate, which defines a hollow portion with the lower end of the body and is provided with a plurality of discharge apertures for discharging filtered fluid through the outlet tube.

The permanent fluid filtering system may further comprises a piston assembly for forcedly compressing and expanding the latitude thread.

BRIEF DESCRIPTION OF THE DRAWINGS

The accompanying drawings, which are incorporated in and constitute a part of the specification, illustrate an embodiment of the invention, and, together with the description, serve to explain the principle of the invention.

DETAILED DESCRIPTION OF THE PREFERRED EMBODIMENTS

Preferred embodiments of the present invention will now be described in detail with reference to the accompanying drawings.

Figure 1:
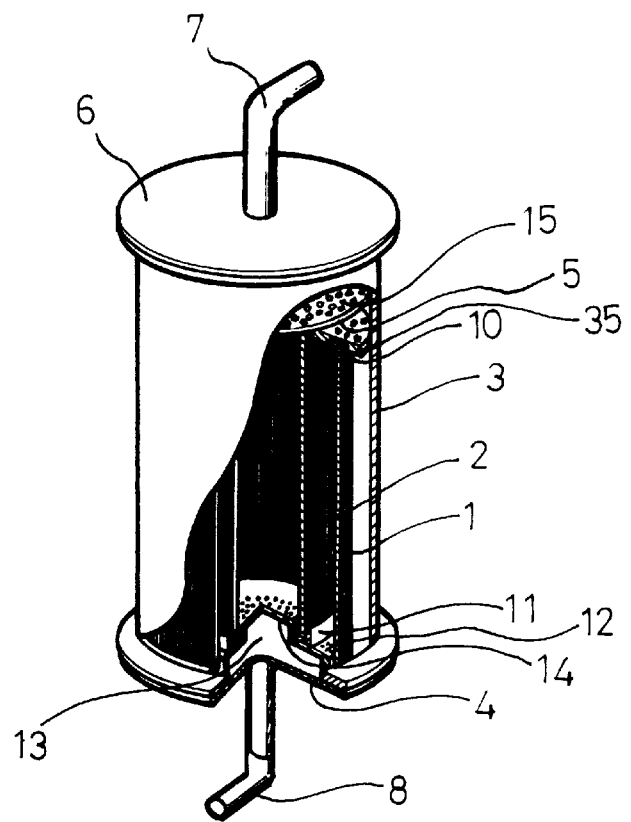
FIG. 1 is a partly broken perspective view of a fluid filtering system according to a first embodiment of the present invention.
Figure 2:
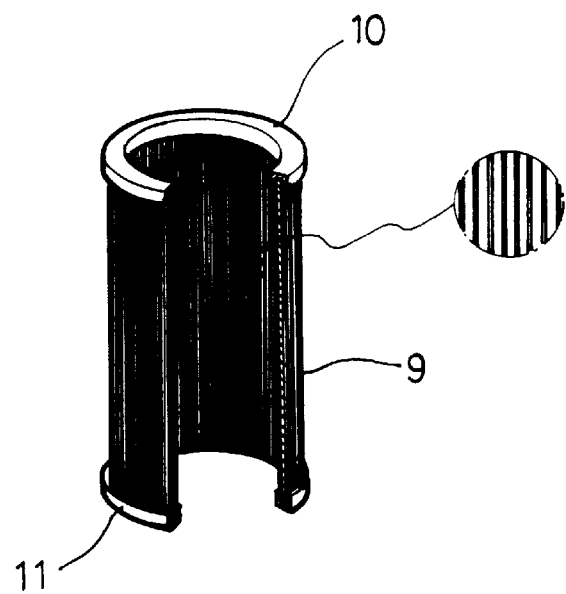
FIG. 2 is a partly broken perspective view of a latitude thread filter assembly depicted in FIG. 1.

FIG. 1 shows a fluid filtering system according to a first embodiment of the present invention, and FIG. 2 shows a latitude thread assembly depicted in FIG. 1.

Referring first to FIG. 1, a fluid filtering system comprises a cylindrical pressure body 3, an upper flange plate 6 mounted on an upper end of the cylindrical pressure body 3, a lower flange plate 4 mounted on a lower end of the cylindrical pressure body 3, an inlet tube 7 fixed on the upper flange plate 6 to feed dirty fluid into the body 3, and an outlet tube 8 fixed on the lower flange plate 4 to discharge filtered fluid.

Disposed inside the cylindrical pressure body or housing 3 is a fluid flow stabilizing plate 5 for stabilizing the flow of dirty fluid fed inside the body 3 through the inlet tube 7. The fluid flow stabilizing plate 5 is provided with a plurality of apertures and fixed on an inner wall of the body 3.

Disposed inside the cylindrical pressure body 3 under the fluid flow stabilizing plate 5 is a latitude thread filter assembly. As shown in FIG. 2, the latitude thread filter assembly comprises an upper holder 10, a lower holder 11, and a plurality of latitude threads 9 supported between the upper and lower holders 10 and 11. The plurality of latitude threads 9 are divided into an outer thread group 1 and an inner thread group 2 disposed on an inner circumference of the outer thread group 1 at a predetermined space therefrom. The number of threads 9 can be varied in accordance with the size of the system.

The threads 9 may be made of a synthetic resin such as polyester, nylon and polypropylene, that are flexible and durable. The upper holder 10 is preferably made of a plastic material so that the same is vertically movable by buoyancy. The shapes of the upper and lower holders 10 and 11 are determined in accordance with a shape of the inner wall of the body 3. That is, the shapes of the upper and lower holders 10 and 11 are designed to be complemental to that of the inner wall of the body 3.

The lower holder 11 is fixed on a fluid collecting plate 14, which defines a hollow portion 13 with the lower flange plate 4 and is provided with a plurality of discharge apertures 12 for discharging filtered fluid through the outlet tube 8.

Figure 3A:
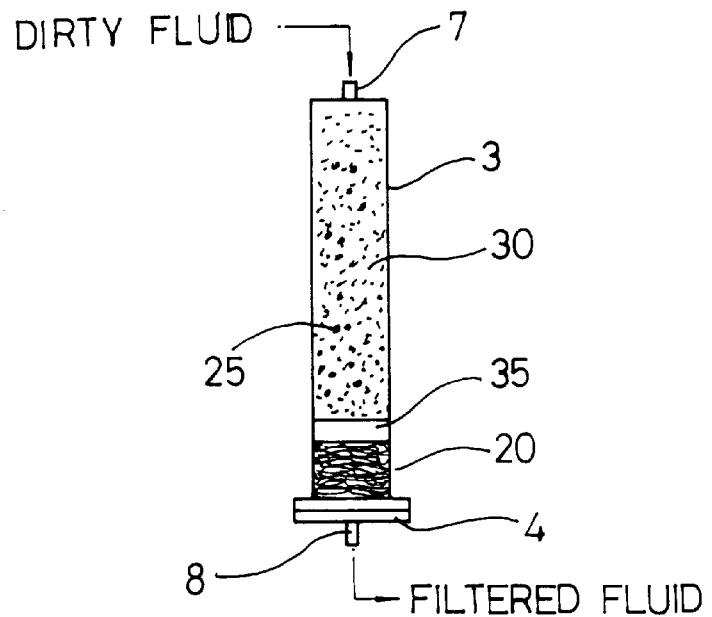
FIG. 3a is a schematic sectional view illustrating a filtering process of a fluid filtering system depicted in FIG. 1.
Figure 3B:
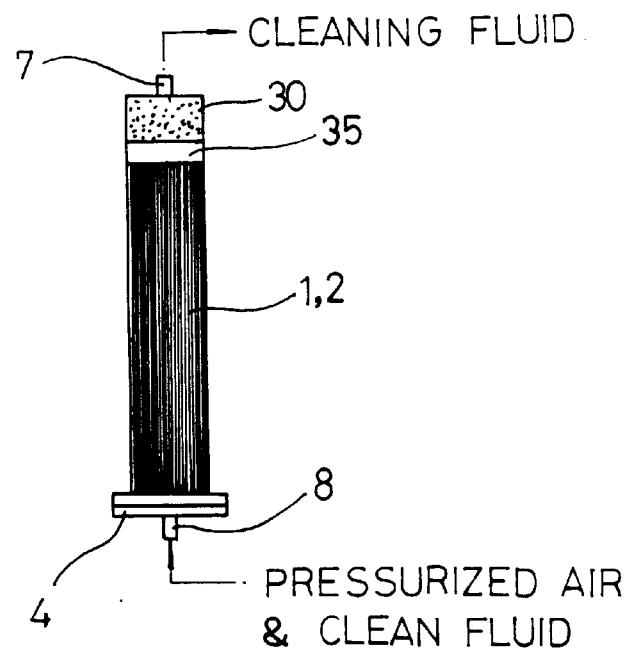
FIG. 3b is a schematic sectional view illustrating a refining process of a fluid filtering system according to a preferred embodiment of the present invention.

Now, the operation of the above described fluid filtering system will be described hereinafter with reference to FIGS. 3a and 3b.

In a filtering operation, when dirty fluid is fed into the body 7 through the inlet tube 7, the upper holder 10, and the outer and inner latitude thread groups 1 and 2 are received a constant fluid pressure as the fluid passes through the fluid flow stabilizing plate 5, thereby compressing the outer and inner latitude thread groups 1 and 2 toward the lower flange plate 4 to provide a minute porous filter layer 20. Therefore, when pressure within the body 3 is increased by the filter layer 20, the suspended solids 25 contained in the dirty fluid are filtered while passing through the filter layer 20. Next, filtered fluid is collected into the hollow portion 13 through the apertures 12 of the collecting plate 14 and then discharged through the outlet tube 8 (See FIG. 3a).

When the filter layer 20 is contaminated by the suspended solids 25 above an allowable value, the latitude thread filter assembly is reversely refined. This will be described more in detail with reference to FIG. 3b.

The reverse refining process is performed in a state where the compression applied to the filter layer 20 is released. That is, when pressurized air and clean fluid are fed into the body through the outlet tube 8, the compression applied to the filter layer 20 is released, and the upper holder 10 is moved upward, thereby increasing the porous structure of the outer and inner latitude filter groups 1 and 2. Therefore, the suspended solids 25 are easily removed from the outer and inner latitude filter groups 1 and 2 by emerging force of pressurized air bubbles and the swirl of the applied clean fluid. The cleaning fluid is exhausted outside through the inlet tube 7 together with the removed suspended solids 25.

As described above, since the porous structure of the filter layer defined by the outer and inner latitude thread groups 1 and 2 is varied in its size during the filtering and refining processes, the filtering efficiency and the refining efficiency are simultaneously improved. Therefore, without replacing the filter assembly, the system can be permanently used.

Figure 4:
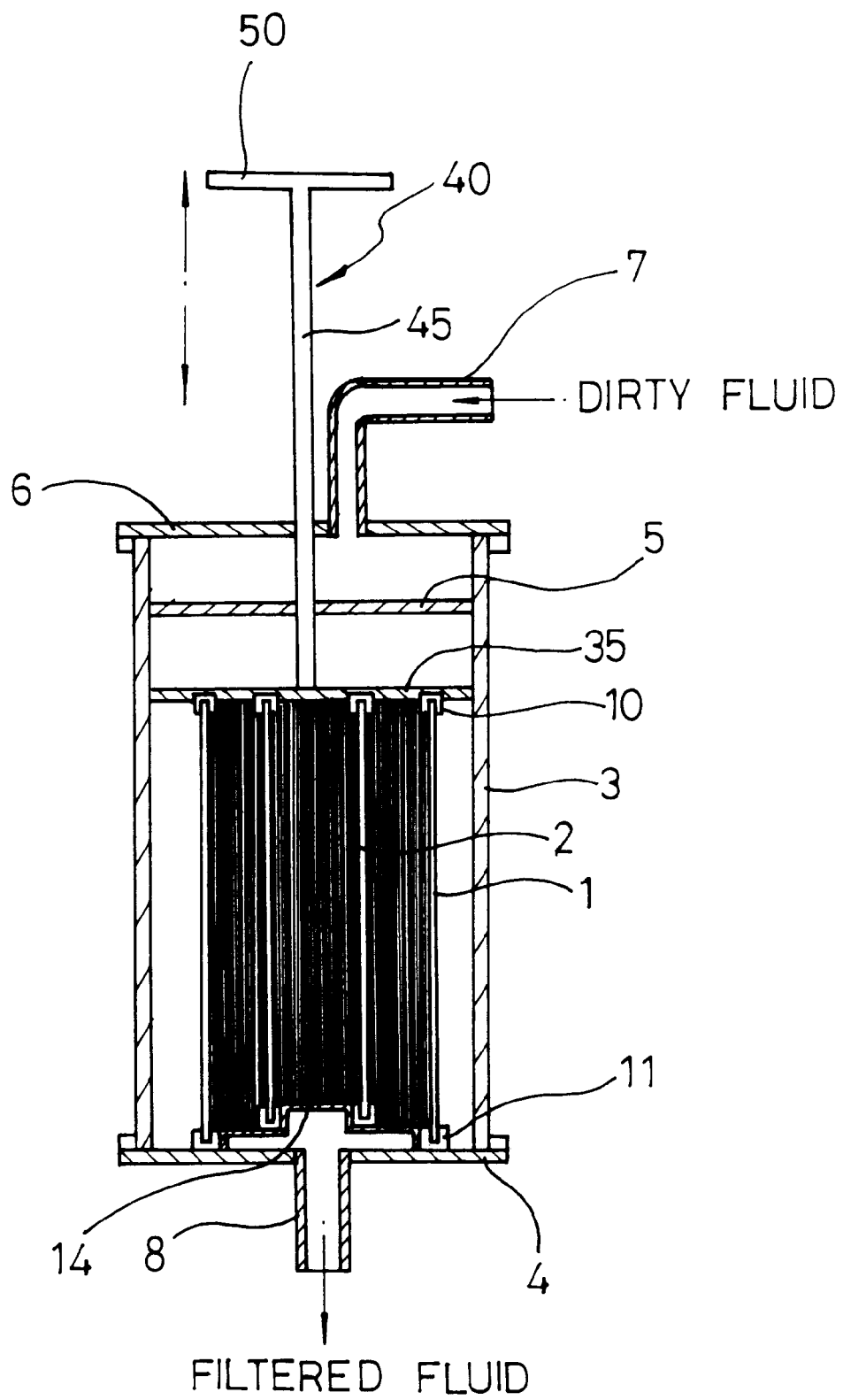
FIG. 4 is a partly broken perspective view of a fluid filtering system according to a second preferred embodiment of the present invention.

FIG. 4 shows a fluid filtering system according to a second preferred embodiment of the present invention.

The fluid filtering system according to this embodiment further comprises a compressing piston assembly 40 which can further apply compressing force to the outer and inner latitude thread groups 1 and 2 which are applied with fluid pressure.

The compressing piston assembly 40 includes a piston plate 35 supporting an upper holder 10, a piston rod 45 fixed on the piston plate 35 and extending out of the body 3, and a handle 50 formed on an outer end of the piston rod 45.

Therefore, in a filtering operation, the piston plate 35 is compressed using the handle 50 to further increase the compressing force applied to the latitude thread groups, thereby reducing the size of the porous structure to increase the filtering efficiency.

In addition, in a refining operation, when pulling the piston plate 35 using the handle 50, the compressed latitude thread groups can be quickly widely extended, thereby increasing the refining efficiency.

Since other parts of this embodiment are equal to those of the first embodiment, the description thereof will be omitted herein.

Other embodiments of the invention will be apparent to the skilled in the art from consideration of the specification and practice of the invention disclosed herein. It is intended that the specification and examples be considered as exemplary only, with the true scope and spirit of the invention being indicated by the following claims.

What is claimed is:

1. A fluid filtering system comprising:
    a cylindrical housing having an inlet at a first end and an outlet at a second end; and
    a thread filter assembly disposed in the cylindrical housing which automatically compresses in response to the fluid flowing from the inlet to the outlet and automatically expands in response to a reverse fluid flow from the outlet to the inlet during filter regeneration, the thread filter comprising:
        a perforate upper holder reciprocatively disposed in the cylindrical housing and slidable within the cylindrical housing in a piston-like manner in response to a pressure differential which is produced thereacross by fluid flow through the cylindrical housing;
        a perforate lower holder immovably disposed proximate the second end of the cylindrical housing;
        a plurality of flexible threads connected between the upper holder and the lower holder and arranged to filter fluid which is passing from the inlet to the outlet of the cylindrical housing, the threads being:
            a) compressively packed into a portion of the cylindrical housing proximate the outlet in a manner wherein the threads are pressed against an inner wall of the cylindrical housing, when fluid flows from the inlet to the outlet and a pressure differential is developed across the upper holder which is caused to slide within the cylindrical housing toward the lower holder, and
            b) pulled to a stretched state which facilitates the purging of matter collected in the threads, when fluid reversedly flows from the outlet to the inlet and the upper holder is induced to slide in the cylindrical housing toward the inlet; and
        a perforate flow stabilizing plate which is separate from the upper holder and which is fixedly disposed in the cylindrical housing between the inlet and the upper holder.

2. A filter as set forth in claim 1, further comprising a rod via which additional force can be externally applied to the upper holder, which is slidably disposed through an end of the cylindrical housing proximate the inlet and the perforate plate, and which is connected to the upper holder.

3. A filter as set forth in claim 1, wherein the fluid which flows from the outlet to the inlet during filter regeneration is a mixture of air and cleaning fluid.

4. A method of operating a filter comprising the steps of:
    passing fluid through an inlet at a first end of a cylindrical housing to an outlet in a second end of the cylindrical housing;
    compressing a thread filter which consists of:
        a perforate upper holder reciprocatively disposed in the cylindrical housing and slidable within the cylindrical housing in a piston-like manner in response to a pressure differential which is produced thereacross by fluid flow through the cylindrical housing;
        a perforate lower holder immovably disposed proximate the second end of the cylindrical housing;
        a plurality of flexible threads connected between the upper holder and the lower holder and arranged to filter fluid which is passing from the inlet to the outlet of the cylindrical housing, by displacing the upper holder toward the second end using a pressure differential which develops across the upper holder in response to fluid flow within the cylindrical housing, thus packing the threads into a lower portion of the cylindrical housing in a manner wherein the threads fill the lower portion and are pressed against an inner wall of the cylindrical housing; and stretching the threads to assume a state which facilitates the purging of matter collected in the threads, by reversing the flow of fluid so that it flows from the outlet to the inlet and displacing the upper holder toward the first end of the cylindrical housing using the pressure differential which is generated across the upper holder; and interposing a fixed perforate flow stabilizing plate between the inlet and the upper holder.

5. A method as set forth in claim 4, further comprising the step of disposing a rod via which additional pressure can be externally applied to the upper holder via the first end of the cylindrical housing and the fixed perforate plate, and connecting the rod to the upper connector.

6. A method as set forth in claim 4, wherein the purging the filter is carried out by causing a mixture of air under pressure mixed with a cleaning fluid to flow from the outlet to the inlet.

* * * * *